2,866,734
Patented Dec. 30, 1958

United States Patent Office

2,866,734
3-PYRIDYLETHYL 2,4-OXAZOLIDINEDIONES AND PROCESS

Seymour L. Shapiro, Hastings-on-Hudson, Louis Freedman, Bronxville, and Ira M. Rose, Yonkers, N. Y., assignors to U. S. Vitamin Corporation, New York, N. Y., a corporation of Delaware No Drawing. Application November 6, 1957
Serial No. 694,731

8 Claims. (Cl. 167—52)

The invention relates to oxazolidinediones and to a process for making them. More particularly, it pertains to the reaction products of oxazolidinediones and 5-substituted oxazolidinediones with a vinyl pyridine and includes correlated improvements and discoveries whereby the preparation of such compounds is enhanced.

An object of the invention is to provide as novel compositions of matter pyridylethylated derivatives of oxazolidinediones and especially pyridylethylated oxazolidinediones which bear a substituent, or substituents, in the 5-position of the oxazolidinedione ring.

A still further object of the invention is the provision of a process for the preparation of a pyridylethylated oxazolidinedione by reacting a pyridine having a vinyl group in the 2-, 4- or 6-position of the pyridine ring with an oxazolidinedione having available the acidic hydrogen on the nitrogen in the 3-position of the oxazolidinedione system and a special object of the invention is the provision of a process for the preparation of pyridylethylated oxazolidinediones by reacting a member of the group consisting of 2-vinyl pyridine, 2-vinyl-5-ethylpyridine and 4-vinylpyridine with a 1,3-oxazolidine-2,4-dione, and with 5-monosubstituted and 5,5-disubstituted derivatives thereof.

Other objects of the invention will in part be obvious and will in part appear hereinafter.

The invention accordingly comprises the several steps and the relation of one or more of such steps with respect to each of the others, and the composition possessing the features, properties and the relation of constituents which are exemplified in the following detailed disclosure and the scope of the invention will be indicated in the claims.

In the practice of the invention an oxazolidinedione may be prepared by reacting a pyridine having a vinyl group in the 2, 4- or 6-position of the pyridine ring with an oxazolidinedione having available the acidic hydrogen on the nitrogen in the 3-position of the oxazolidinedione system. The reaction which takes place may be illustrated by the following equation:

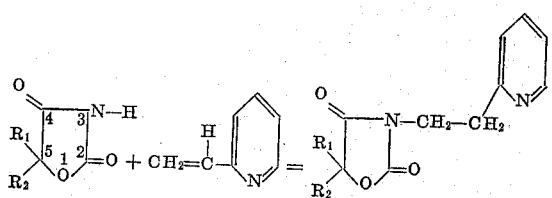

in which $R_1$ and $R_2$ are members of the group consisting of hydrogen, lower alkyl, cycloalkyl, aryl, aralkyl and structures wherein $R_1$ plus $R_2$ is an alkylene chain and a methyl substituted alkylene chain joined at the 5-carbon atom of the oxazolidinedione ring system said alkylene chain having a carbon content $C_4$–$C_7$. It will be recognized that when $R_1$ and $R_2$ are different, that the carbon atom at position 5 of the oxazolidinedione ring system is asymmetric and capable of resolution into d and l forms.

These forms separated or unseparated are to be considered within the purview of this invention.

Further, the alkyl group may have a carbon content $C_1$–$C_7$, hence methyl to heptyl; the cycloalkyl may have a carbon content $C_3$–$C_6$, thus cyclopropyl to cyclohexyl; the aryl group may be phenyl and tolyl, and a substituent on the aryl may be halogen, hydroxyl, alkyl, alkoxy and aralkyl containing from 7–8 carbon atoms. Moreover, $R_1$ and $R_2$ may be satisfied by a single cycloalkyl group having a carbon content of $C_4$–$C_6$, wherein $R_1$ and $R_2$ may be joined as a methylene group bridge of from 4–6 carbon atoms having the structure

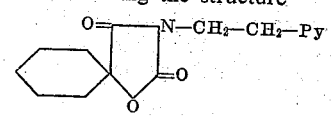

Py having the meaning given below.

When the spirosubstituent derived from the methylene chain formed by the juncture of $R_1$ plus $R_2$ in the compounds described immediately above, bears a substituent such as methyl, then two diastereoisomeric forms of the compound are possible. While we have not definitely determined the exact stereochemical relationship of the two forms, it is likely that in one instance the oxygen atom at the 1 position of the oxazolidinedione ring system is attached as an equatorial group to the cyclohexyl ring, whereas in the other isomer the oxygen at position 5 of the ring is attached as an axial group to the cyclohexyl ring. These respective forms are structurally depicted as follows:

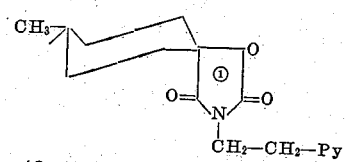

(O attached as equatorial group)

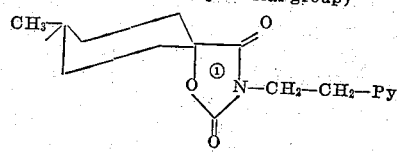

(O attached as axial group)

We have succeeded in preparing the individual isomers and the invention embodies these compounds as mixtures, and as individual entities.

For simplicity and clarity of characterization where these isomers have been separated the two forms of the reactant oxazolidinedione unsubstituted in the 3-position have been designated as Form A and Form B, and are recognizable by their physical constants. The corresponding 3-pyridylethylated derivatives in turn are designated in the tables as being derived from the appropriate Form A or Form B of the reactant unsubstituted oxazolidinedione.

Because of the tendency of the vinylpyridines to polymerize they ordinarily contain an inhibitor to prevent polymerization during storage. The inhibitor may be removed before reaction of the vinylpyridine with the oxazolidinedione, but this, however, is not necessary since we have found that the reaction proceeds with the inhibitor present.

The reaction conditions for effecting the condensation may be varied, thus the reactants may be mixed in equal molar proportions; an excess of either of the reactants may be used; condensation may be effected in the absence of a solvent; an inert-solvent may be employed as the reaction medium, and a basic catalyst, such as choline, benzyltrimethylammonium hydroxide, sodium, sodamide and the like may be employed. We have found, however, that structural characteristics inherent in the initial reactants are sufficient to carry the condensation without a catalyst. Since there is some tendency for the vinyl pyridine to polymerize during the course of the reaction, we have found that the preferred synthetic process is to use either equal molar concentrations of the reactants, or a slight molar excess of the oxazolidinedione over the vinyl pyridine. The exothermic reaction noted on mixing the vinylpyridine with the oxazolidinedione indicates condensation even at room temperature. However, we have found that the condensation takes place readily by heating the reaction mixture in the temperature range of 120°–170° C. for 0.5–2 hours. Temperatures which are lower lead to markedly slower reaction times, and higher reaction temperatures cause decomposition and polymerization, and thus complicate isolation of the product.

The compounds may be defined as pyridylethylated oxazolidinediones and are represented by the following general formula:

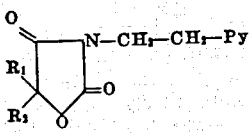

in which $R_1$ and $R_2$ have same meaning as above, and Py represents a member of the group consisting of 2-pyridyl, alkyl-substituted-2-pyridyl said alkyl having a carbon content $C_1$–$C_2$, and 4-pyridyl, and acid addition and quarternary ammonium salts thereof, which are stable and non-toxic. The conventional numbering in this ring system is indicated starting with 1 at the ring oxygen atom, and proceeding counterclockwise through the oxazole ring. In accordance with this nomenclature the oxygen is in the 1-position; the nitrogen is in the 3-position, and the carbonyl oxygens are in the 2- and 4-positions, and hence the substituents $R_1$ and $R_2$ in the 5-position result in the designation 3-[pyridylethyl]-5,5,-$(R_1,R_2)$-1,3-oxazolidine-2,4-diones for the ring compounds herein described.

While many of the free bases of the novel pyridylethyl oxazolidinediones have substantial water solubility; for many purposes, and particularly in the instance of the less water soluble free bases, it is desirable to convert the bases to water soluble acid addition salts. The acids which can be used to prepare acid addition salts are mineral acids such as hydrochloric, hydrobromic, nitric, phosphoric and sulfuric acids, and organic acids such as lactic, glycolic, citric, tartaric, and the like. Further, the bases are readily converted to the acid addition salts by direct interaction of the base with the acid in the presence of a solvent. Moreover, the acid addition salts are preferably those whose anions are relatively innocuous.

The bases can also be converted to quaternary ammonium salts derived from the lower alkyl esters of strong inorganic acids, e. g., methyl halides, methyl sulfate, methyl tosylate, ethyl halides, and the like.

As an illustrative embodiment of a manner in which the invention may be practiced, the following examples are presented. The required reactant oxazolidinediones having an acidic hydrogen on the nitrogen in the 3-position are conveniently preparable by procedures described in the literature (R. W. Stoughton, J. Am. Chem. Soc. 63:2376, 1941; V. H. Wallingford, M. A. Thorpe and R. W. Stoughton, J. Am. Chem. Soc. 67:522, 1954). The detailed descriptions typify the preparation of the reactant unsubstituted oxazolidinediones.

EXAMPLE I

*3-(2-[2-pyridyl-5-ethyl])ethyl-1,3-oxazolidine-2,4-dione*

A mixture of 6.0 g. (0.0594 mole) of 1,3-oxazolidine-2-4-dione and 7.91 g. (0.0554 mole) of 2-vinyl-5-ethyl-pyridine in a flask equipped with an air condenser was heated in an oil bath at 150° C. for 2 hours.

After the reaction mixture had cooled the crystallized reaction product was triturated with hexane. The crude product was dissolved in 100 cc. of water; the pH value adjusted to 7–8 with sodium bicarbonate, and the aqueous solution extracted with three 50 cc. portions of ether. The ether extracts were combined; evaporated; the product dried in a desiccator over phosphorous pentoxide, and then triturated with hexane yielding almost colorless crystals, M. P. 65° C.

EXAMPLE II

*3-(2-[4-pyridyl])ethyl-5-methyl-1,3 oxazolidine-2,4-dione*

A mixture of 7.61 g. (0.0724 mole) of 4-vinyl pyridine and 10.0 g. (20% excess) of 5-methyl-1,3-oxazolidine-2,4-dione was prepared and the reaction mixture became quite warm. After heating in oil bath at 150° C. for 2¼ hrs. the reaction mixture was distilled and the product obtained as a colorless oil, B. P. 131°–148° C./.015 mm. from a bath at 186°–196° C.

EXAMPLE III

*3-(2-[2 - pyridyl])ethyl - 5,5 - dimethyl-1,3-oxazolidine-2,4-dione*

A mixture of 7.61 g. (0.0724 mole) of 2-vinylpyridine and 9.81 g. (5% excess) of 5,5-dimethyl-1,3-oxazolidine-2,4-dione was reacted as described in Example II. The product distilled as a colorless oil, at 115°–132° C./.01 mm. from an oil bath at 181.5°–186° C.

EXAMPLE IV

*3-(2-[2-pyridyl - 5 - ethyl])ethyl - 5 - (3-heptyl)-1,3-oxazolidine-2,4-dione*

A mixture of 5.98 g. (0.03 mole) of 5-(3-heptyl)-1,3-oxazolidine-2,4-dione and 4.0 g. (0.03 mole) of 2-vinyl-5-ethylpyridine was reacted at 150° C. for two hours.

The reaction mixture was cooled; dissolved in 50 cc. of ether, and the product extracted as its hydrochloride by shaking with 60 cc. of 0.75 N hydrochloric acid. The acid aqueous phase after washing with ether was adjusted to pH 7–8 with 4.5 g. of sodium bicarbonate, and the oily product which separated was extracted with two 50 cc. portions of ether. The ether extracts were combined; the ether removed, and 25 ml. of benzene added. After removal of volatiles at 150° C.; the product distilled by short path distillation from a bath at 190°–200° C. at 170°–172° C./0.06 mm. as a colorless oil.

EXAMPLE V

*3-(2-[4-pyridyl])ethyl-5-phenyl-1,3-oxazolidine-2,4-dione*

A mixture of 7.79 g. (0.044 mole) of 5-phenyl-1,3-oxazolidine-2,4-dione and 4.63 g. (0.044 mole) of 4-vinylpyridine was reacted at 150° C. for two hours. The reaction mixture after cooling was dissolved in dilute hydrochloric acid treated with animal charcoal and filtered. Saturated aqueous sodium bicarbonate solution was then added slowly with constant stirring until pH of 7–8, and the product which crystallized out was separated and dried, M. P. 76°–90° C. which on recrystallization from ethyl acetate-hexane, melted at 107.5°–109° C.

EXAMPLE VI

*3-(2-[2-pyridyl-5-ethyl])ethyl-5,5-diphenyl-1,3-oxazolidine-2,4-dione hydrochloride*

A mixture of 5.06 g. (0.02 mole) of 5,5-diphenyl-1,3-oxazolidine-2,4-dione and 2.66 g. (0.02 mole) of 2-vinyl-5-ethylpyridine was reacted at 150° C. for 2 hours.

The cooled reaction product was then converted to the hydrochloride by dissolving in ethanol and bubbling hydrogen chloride gas into the solution. When ether was added the hydrochloride crystallized, M. P. 146°–156° C. The hydrochloride was recrystallized from ethyl acetate.

Alternatively the hydrochloride can be conveniently prepared by dissolving the reaction product in dilute hydrochloric acid and adding concentrated hydrochloric acid with precipitation of the hydrochloride due to its being sparingly soluble in concentrated hydrochloric acid.

EXAMPLE VII

*3-(2-[4-pyridyl])ethyl-5-phenyl-1,3-oxazolidine-2,4-dione*

A mixture of 7.79 g. (0.044 mole) of 5-phenyl-1,3-oxazolidine-2,4-dione and 4.63 g. (0.044 mole) of 2-vinyl pyridine was reacted at 150° C. for two hours. The reaction mixture was cooled and dissolved in 50 cc. of ether, and the product extracted from ether with 60 cc. of 0.75 N hydrochloric acid. The acid aqueous phase after washing with ether was adjusted to pH 7–8 with 4.5 g. of solid sodium bicarbonate and the oily product which separated extracted into two 50 cc. of ether. The ether extracts were combined; treated with charcoal; filtered, and the ether removed on a steam bath. The oily residue was treated with 25 ml. of benzene and the benzene removed on a steam bath. The residue was stripped of volatiles by heating at a bath temperature of 192° C. at 0.15 mm. pressure. The residue, not distilling, was the desired product, and was obtained as a viscous oil which is completely soluble in 3 N hydrochloric acid. The product does not distill under ordinary conditions of vacuum distillation without some decomposition.

EXAMPLE VIII

*3-(2-[4-pyridyl])ethyl-5,5-diphenyl-1,3-oxazolidine-2,4-dione methiodide*

A suspension of 2.0 g. of 3-(2-[4-pyridyl])-ethyl-5,5-diphenyl-1,3-oxazolidine-2,4-dione in 40 cc. of ethanol was treated with 3 cc. of methyl iodide. The solution thus formed after standing 16 hours, and scratching, yielded a crop of light yellow crystals which were separated and rinsed with fresh ethanol, M. P. 166–8° C.

EXAMPLE IX

*5,5-tetramethylene-1,3-oxazolidine-2,4-dione*

A mixture of 3.6 g. (0.157 mole) of sodium metal in 38 ml. of methanol and 20.2 g. (0.172 mole) of diethyl carbonate was heated under reflux, a solution of 19.4 g. (0.15 mole) of 1-hydroxycyclopentane carboxamide in 50 ml. of hot methanol added, and heating continued for 4 hours. The methanol was removed by distillation; and the residue was dissolved in 100 ml. of water and filtered. The filtrate was washed with two 50 ml. portions of ether and then aerated to remove the dissolved ether. After acidification with concentrated hydrochloric acid (13 ml.) and standing 16 hours, the product was separated, washed with water and dried, M. P. 132°–133° C. On extraction of the filtrate with four 50 ml. portions of ether, additional product was obtained.

EXAMPLE X

*5,5-(3'-methylpentamethylene)-1,3-oxazolidine-2,4-dione (2 isomers)*

The mixture of stereoisomers was prepared, as in Example IX from 18.5 g. (0.118 mole) of 1-hydroxy-4-methylcyclohexane carboxamide (mixture of isomers). In the final acidification step, careful addition of 3 N hydrochloric acid, the separation point of the two isomers was taken as that point at which further acid addition gave a semipermanent cloudiness which did not clear in a few seconds by crystallization to the hard needles of the high melting isomer. This isomer was filtered off, washed with water, and dried, M. P. 107°–108° C. (Form A). It was unchanged by recrystallization from ethylacetate-hexane. On complete acidification of the filtrate, the low melting isomer was obtained, M. P. 76°–79° C. (Form B.) It was unchanged by recrystallization from hexane.

EXAMPLE XI

*5-(p-chlorophenyl)-5-methyl-1,3-oxazolidine-2,4-dione*

This compound which is an initial reactant for condensation with the vinylpyridines shown in the previous examples was obtained by the following sequence of reactions

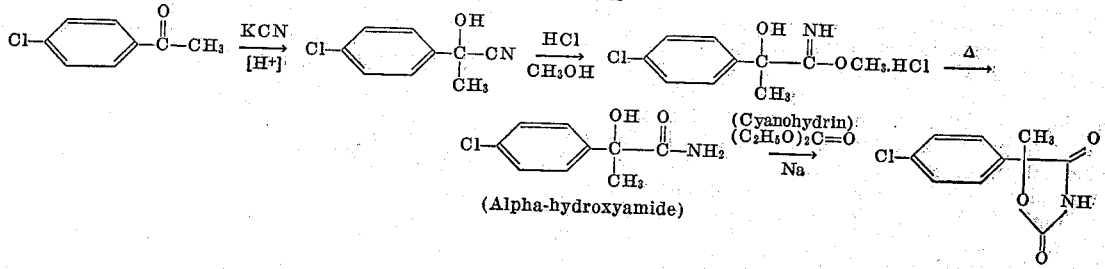

The cyanohydrin was prepared in the following manner: To a cooled (5°–10° C.) well stirred mixture of 103 g. (0.666 mole) of p-chloroacetophenone, 60 ml. of ether, 100 ml. of water, and 82 g. (1.67 moles) of sodium cyanide, concentrated hydrochloric acid (140 ml. (1.7 moles)) was added dropwise over a period of 1.7 hours. Stirring was continued for 2 hours at ambient temperature. The ether layer was separated, dried over magnesium sulfate, filtered, and the ether removed by evaporation. The crystalline product after trituration with hexane had an M. P. 82°–85° C. Recrystallization hexane gave crystals, having an M. P. 92°–93.5° C. The alpha-hydroxy amide was prepared in the following manner. A solution of 55.4 g. (0.33 mole) p-chloroatrolactonitrile (as prepared above) in 550 ml. of ether containing 12 ml. of methanol, was saturated with dry hydrogen chloride gas maintaining temperature below 0° C. After one hour imino ester hydrochloride separated, and after the second hour an additional amount was obtained. Upon pyrolysis of the imino ester hydrochloride at 150° C. for 45 minutes and cooling, the amide crystallized. After solution in 100 ml. of ethyl acetate and filtration to remove ammonium chloride, and addition of 240 ml. of hexane to the filtrate the amide was obtained having an M. P. 116°–117° C. The alpha-hydroxy amide was converted to the 5-(p-chlorophenyl)-5-methyl-1,3-oxazolidine-2,4-dione in the following manner: Sodium metal, 2.42 g. (0.105 mole) was dissolved in 25 ml. of refluxing methanol. Then 13.6 g. (0.115 mole) of diethyl carbonate were added; and when reflux commenced again, a solution of 19.95 g. (0.10 mole) of p-chloroatrolactamide (as prepared above) in 25 ml. of methanol was added. After four hours under reflux, the methanol was removed and the cooled residue was dissolved in 75 ml. of water. After washing twice with 100 ml. portions of ether, air was passed through the aqueous solution to remove dissolved ether and the product was precipitated by slow addition of excess 3 N hydrochloric acid. The crude product was filtered, washed with water and dried in vacuo, and had an M. P. 103°–106° C. Recrystallization from hexane-ethyl acetate raised the melting point to 110°–111° C.

EXAMPLE XII

*5-cyclohexyl-5-methyl-1,3-oxazolidine,2,4-dione*

This compound which is an initial reactant for condensations with vinylpyridines as shown in the previous examples was obtained by the following sequence of reactions.

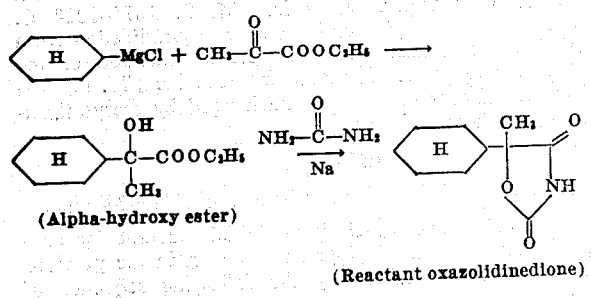

(Alpha-hydroxy ester)

(Reactant oxazolidinedione)

The alpha-hydroxy ester was prepared in the following manner. Magnesium turnings, 5.35 g. (0.22 mole) were covered with 30 ml. of ether. 5 ml. of cyclohexyl chloride were added and then a crystal of iodine. Without stirring, the mixture was heated gently till the iodine color had disappeared and the reaction was self sustaining. Then 30 ml. of ether were added and with stirring, the remainder of 23.0 g. (0.20 mole) of cyclohexyl chloride in 60 ml. of ether was added dropwise to maintain gentle reflux. Reflux was maintained for 20 minutes after addition. This solution was filtered through glass wool into a dropping funnel and added, with stirring to a solution of 23.2 g. (0.20 mole) of ethyl pyruvate in 150 ml. of benzene at −5 to 0° over 40 minutes and stirred 40 minutes more. The solution was poured onto crushed ice and enough dilute sulfuric acid added to give an acidic aqueous layer which was removed and extracted twice with ether. The combined organic layers were washed with dilute sodium bicarbonate, dried over magnesium sulfate and solvents removed. On distilling the residue in vacuo, 9.4 g. of product were obtained at 84°–100° C./1.1 mm.

To a solution of 1.02 g. (0.0445 mole) of sodium metal in 25 ml. of ethanol, 2.66 g. (0.0445 mole) of urea were added and dissolved under reflux. Then 8.9 g. (0.0445 mole) of the alpha-hydroxy ester prepared above were added, rinsed in with 5 ml. of ethanol, and reflux continued for 6 hours. Ethanol was removed on a steam bath; the cooled residue dissolved in 100 ml. of water, and the solution washed twice with ether. The aqueous layer was then acidified with 3 N hydrochloric acid and the oily product extracted with ether. The ether was removed on a steam bath, and the residue distilled in vacuo, giving a viscous oil, boiling at 108°–128° C./0.08 mm. When a solution of this material in 130 ml. of hot hexane was allowed to cool slowly, a product crystallized having an M. P. 74.5°–75.5° C.

EXAMPLE XIII 3-(2-[2-pyridyl])ethyl-5-(p-chlorophenyl)-5-methyl-1,3-oxazolidine-2,4-dione A mixture of 4.0 g. (0.0177 mole) of 5-p-chlorophenyl-5-methyl-1,3-oxazolidine-2,4-dione and 2.04 g. (10% excess) of 2-vinyl pyridine was heated at 150° C. for 2 hours. The acidified (hydrochloric acid) solution of the cooled residue was washed with ether. The product which precipitated on the addition of excess sodium bicarbonate was separated, having an M. P. 67°–68° C. Recrystallization from a large volume of hexane raises the M. P. to 69°–69.5° C.

EXAMPLE IV 3-(2-[2-pyridyl-5-ethyl])ethyl-5-cyclopropyl-5-methyl-1,3-oxazolidine-2,4-dione A solution of 5.0 g. (10% excess) of 5-cyclopropyl-5-methyl-1,3-oxazolidine-2,4-dione and 4.0 g. (0.03 mole) of 2-vinyl-5-ethyl pyridine was heated at 150° C. for two hours. The acidified (hydrochloric acid) aqueous solution of the cooled residue was washed with ether. After the addition of excess sodium bicarbonate solution the separated oily product was extracted with ether. After removal of the ether, the residue was fractionated by short path distillation and the product, boiling at 158°–168° C./0.050 mm., collected.

EXAMPLE XV 3-(2-[4-pyridyl])ethyl-5,5-pentamethylene-1,3-oxazolidine-2,4-dione A mixture of 4.65 g. (0.030 mole) of 5,5-pentamethylene-1,3-oxazolidine-2,4-dione and 3.5 g. (10% excess) of 4-vinylpyridine was heated at 150° C. for 2 hours. The melt solidified on cooling and was triturated with hexane yielding 7.42 g. of product M. P. 73.5°–75°. Recrystallization (hexane) raises the M. P. to 77°–77.5° (64%).

EXAMPLE XVI 3-(2-[4 pyridyl])ethyl-5-ethyl-5-methyl-1,3-oxazolidine-2,4-dione A solution of 8.0 g. (10% excess) of 5-ethyl-5-methyl-1,3-oxazolidine-2,4-dione and 5.26 g. (0.050 mole) of 4-vinylpyridine was heated at 150° C. for 2 hours. The cooled mass was dissolved in 50 ml. of benzene and washed with sodium bicarbonate solution. After removal of the benzene the residue crystallized, there being obtained a product which melted at 74°–81° C. Recrystallization (hexane) raises the M. P. to 80°–81° C.

The following table, Table I, presents constants and characteristics of compounds representative of those herein disclosed. It will be understood that the description above, and the specific compounds listed in the table and in the preceding examples, are illustrative only, and that they may be varied or modified to a considerable extent without departing from the spirit of the invention or sacrificing the advantages thereof, and therefore the invention is not to be limited to the specific embodiments herein set forth.

TABLE I.—3-PYRIDYLETHYLATED-OXAZOLIDINE-DIONES

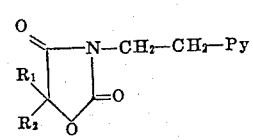

Py = 2-pyridyl = A
Py = 2-pyridyl-5-ethyl = B
Py = 4-pyridyl = C
Ph = phenyl ($C_6H_5$)

| $R_1$ | $R_2$ | Py | Formula | B. P., ° C./mm. press. | M. P., ° C. |
|---|---|---|---|---|---|
| H | H | A | $C_{10}H_{10}N_2O_3$ | --- | 89–90. Methiodide 168–73. |
| H | H | B | $C_{12}H_{14}N_2O_3$ | --- | 65. Methiodide 140–1. |
| H | H | C | $C_{10}H_{10}N_2O_3$ | --- | 129.5–30. Methiodide 145–8. |

| R₁ | R₂ | Py | Formula | B.P., °C./mm. press. | M.P., °C. |
|---|---|---|---|---|---|
| CH₃ | H | A | C₁₁H₁₂N₂O₃ | 126–32/0.01 | |
| CH₃ | H | B | C₁₃H₁₆N₂O₃ | 144–50/0.01 | |
| CH₃ | H | C | C₁₁H₁₂N₂O₃ | 131–48/0.01 | |
| CH₃ | CH₃ | A | C₁₂H₁₄N₂O₃ | 115–32/0.01 | |
| CH₃ | CH₃ | B | C₁₄H₁₈N₂O₃ | 129–36/0.01 | |
| CH₃ | CH₃ | C | C₁₂H₁₄N₂O₃ | 128–9/0.04 | 72.5–3.5. |
| C₄H₉–CH(C₂H₅)– | H | A | C₁₇H₂₄N₂O₃ | 166–74/0.06–0.1 (short path) | |
| C₄H₉–CH(C₂H₅)– | H | B | C₁₉H₂₈N₂O₃ | 170–2/0.06 (short path) | |
| C₄H₉–CH(C₂H₅)– | H | C | C₁₇H₂₄N₂O₃ | 167–72/0.03 (short path) | |
| Ph | H | A | C₁₆H₁₄N₂O₃ | Isolated as residue (see Example VII). | |
| Ph | H | B | C₁₈H₁₈N₂O₃ | do | |
| Ph | H | C | C₁₆H₁₄N₂O₃ | | 107.5–9. |
| Ph | Ph | A | C₂₂H₁₈N₂O₃·HCl | | 154–70. |
| Ph | Ph | B | C₂₄H₂₂N₂O₃·HCl | | 145–56. |
| Ph | Ph | C | C₂₂H₁₈N₂O₃ | | 107. Methiodide 166–8. |
| C₂H₅– | H | A | C₁₂H₁₄N₂O₃ | 155/0.05 | |
| C₂H₅– | H | B | C₁₄H₁₈N₂O₃ | 155/0.08 | |
| C₂H₅– | H | C | C₁₂H₁₄N₂O₃ | 155/0.01 | |
| C₂H₅– | CH₃– | A | C₁₃H₁₆N₂O₃ | 144–162/0.1 | |
| C₂H₅– | CH₃– | B | C₁₅H₂₀N₂O₃ | 142–170/0.1 | |
| C₂H₅– | CH₃– | C | C₁₃H₁₆N₂O₃ | | |
| i-C₃H₇– | H | A | C₁₃H₁₆N₂O₃ | 160–170/0.08 | 80–81. |
| i-C₃H₇– | H | B | C₁₅H₂₀N₂O₃ | 160/0.12 | |
| i-C₃H₇– | H | C | C₁₃H₁₆N₂O₃ | 164/0.55 | |
| i-C₃H₇– | CH₃– | A | C₁₄H₁₈N₂O₃ | 160–164/0.08–0.10 | |
| i-C₃H₇– | CH₃– | B | C₁₆H₂₂N₂O₃ | 160–166/0.03 | |
| i-C₃H₇– | CH₃– | C | C₁₄H₁₈N₂O₃ | 160–167/0.03 | |
| –(CH₂)₄– | | A | C₁₄H₁₆N₂O₃ | 162–176/0.06 | |
| –(CH₂)₄– | | B | C₁₄H₁₆N₂O₃ | | 34–36. |
| –(CH₂)₄– | | C | | | 77–78. |
| –(CH₂)₅– | | A | C₁₄H₁₈N₂O₃ | | 63. |
| –(CH₂)₅– | | B | C₁₅H₁₈N₂O₃ | | 99–100. |
| –(CH₂)₅– | | C | C₁₇H₂₂N₂O₃ | | 108–109. |
| –(CH₂)₄–CHCH₃– | | A | C₁₅H₁₈N₂O₃ | | |
| –(CH₂)₄–CHCH₃– | | B | C₁₆H₂₀N₂O₃ | 170–178/0.05 | |
| –(CH₂)₄–CHCH₃– | | C | C₁₈H₂₄N₂O₃ | 186–194/0.05 | |
| –(CH₂)₃–CHCH₃–CH₂– | | A | C₁₆H₂₀N₂O₃ | | 69–70. |
| –(CH₂)₃–CHCH₃–CH₂– | | B | C₁₈H₂₄N₂O₃ | | 79–84. |
| –(CH₂)₃–CHCH₃–CH₂– | | C | C₁₆H₂₀N₂O₃ | | 102–106. |
| –(CH₂)₂–CHCH₃–(CH₂)₂– Form A | | A | C₁₆H₂₀N₂O₃ | | 77–111. |
| –(CH₂)₂–CHCH₃–(CH₂)₂– | | B | C₁₈H₂₄N₂O₃ | | 60. |
| –(CH₂)₂–CHCH₃–(CH₂)₂– | | C | C₁₆H₂₀N₂O₃ | | 52–53. |
| –(CH₂)₂–CHCH₃–(CH₂)₂– Form B | | A | C₁₆H₂₀N₂O₃ | | 107–108. |
| –(CH₂)₂–CHCH₃–(CH₂)₂– | | B | C₁₈H₂₄N₂O₃ | | 110–120. |
| –(CH₂)₂–CHCH₃–(CH₂)₂– | | C | C₁₆H₂₀N₂O₃ | | 45–65. |
| | | | | | 84–87. |
|  (cyclopropyl) | –CH₃– | A | C₁₄H₁₆N₂O₃ | 148–156/0.05 | |
|  | –CH₃– | B | C₁₆H₂₀N₂O₃ | 158–168/0.05 | |
|  | –CH₃– | C | C₁₄H₁₆N₂O₃ | 170–174/0.05 | |
|  (cyclohexyl) | –CH₃– | A | C₁₇H₂₂N₂O₂ | | 58–60. |
|  | –CH₃– | B | C₁₉H₂₆N₂O₃ | 176–178/0.05 | |
|  | –CH₃– | C | C₁₇H₂₂N₂O₃ | | 100. |
| Ph– | C₂H₅– | A | C₁₈H₁₈N₂O₃ | 188–196/0.03 | |
| Ph– | C₂H₅– | B | C₂₀H₂₂N₂O₃ | 190–198/0.08 | |
| Ph– | C₂H₅– | C | C₁₈H₁₈N₂O₃ | 198–206/0.1 | |
| p-Cl-ph | CH₃– | A | C₁₇H₁₅N₂O₃Cl | | 69–70. |
| p-Cl-ph | CH₃– | B | C₁₉H₁₉N₂O₃Cl | | 52–53. |
| p-Cl-ph | CH₃– | C | C₁₇H₁₅N₂O₃Cl | | 77–78. |
| Ph(CH₂)₂– | CH₃– | A | C₁₉H₂₀N₂O₃ | 200/0.08 | |
| Ph(CH₂)₂– | CH₃– | B | C₂₁H₂₄N₂O₃ | 210/0.08 | |
| Ph(CH₂)₂– | CH₃– | C | C₁₉H₂₀N₂O₃ | 207/0.08 | |

A large number of intermediates which are not readily available have been employed in the preparation of the compounds of this invention. The table which follows (Table II) lists the characteristics of these intermediates which were reacted by procedures indicated in the examples.

barbiturate sleeping time, depression of central nervous system activity and allied pharmacological types of activity.

Typical formulations of the compounds of this invention include tablets for oral use, sterile solutions and suppositories.

TABLE II.—TABULAR REPRESENTATION OF INITIAL REACTANTS $Xa$ (cyanhydrin)    $Xb$ (alpha-hydroxy-amide)    $Xc$ (oxazolidine-dione)

| $R_1$ | $R_2$ | X | M. P., °C. | B. P., °C./mm. pressure |
|---|---|---|---|---|
| $C_2H_5-$ | H | $Xa$ | | 88/12 |
| $C_2H_5-$ | H | $Xb$ | 105–107 | |
| $C_2H_5-$ | H | $Xc$ | | 118/0.7 |
| $C_2H_5-$ | $CH_3-$ | $Xa$ | | 86/12 |
| $C_2H_5-$ | $CH_3-$ | $Xb$ | 68–70 | |
| $C_2H_5-$ | $CH_3-$ | $Xc$ | | 98/0.005 |
| $i-C_3H_7-$ | H | $Xa$ | | 90/10 |
| $i-C_3H_7-$ | H | $Xb$ | 105–106 | |
| $i-C_3H_7-$ | H | $Xc$ | | 106–110/0.1 |
| $i-C_3H_7-$ | $CH_3-$ | $Xa$ | | 82/10 |
| $i-C_3H_7-$ | $CH_3-$ | $Xb$ | 83–85 | |
| $i-C_3H_7-$ | $CH_3-$ | $Xc$ | | 111/0.35 |
| $-(CH_2)_4-$ | | $Xa$ | | 86/0.7 |
| $-(CH_2)_4-$ | | $Xb$ | 137–138 | |
| $-(CH_2)_4-$ | | $Xc$ | 132–133 | |
| $-(CH_2)_5-$ | | $Xa$ | | 102/3 |
| $-(CH_2)_5-$ | | $Xb$ | 127–128 | |
| $-(CH_2)_5-$ | | $Xc$ | 113–114 | |
| $-(CH_2)_4-CHCH_3-$ | | $Xa$ | 52–56 | |
| $-(CH_2)_4-CHCH_3-$ | | $Xb$ | 120–121 | |
| $-(CH_2)_4-CHCH_3-$ | | $Xc$ | 93–4 | |
| $-(CH_2)_2-CHCH_3-CH_2-$ | | $Xa$ | | 108/7 |
| $-(CH_2)_2-CHCH_3-CH_2-$ | | $Xb$ | 87–95 | |
| $-(CH_2)_2-CHCH_3-CH_2-$ | | $Xc$ | | 117–123/0.10 |
| $-(CH_2)_2-CHCH_3-(CH_2)_2-$ | | $Xa$ | | 108/7 |
| $-(CH_2)_2-CHCH_3-(CH_2)_2-$ | | $Xb$ | 145–150 | |
| $-(CH_2)_2-CHCH_3-(CH_2)_2-$ | | $Xc$ | 107–108 | |
| $-(CH_2)_2-CHCH_3-(CH_2)_2-$ Form A | | $Xc$ | 76–79 | |
| $-(CH_2)_2-CHCH_3-(CH_2)_2-$ Form B | | | | |
| (cyclopropyl) | $CH_3-$ | $Xa$ | | 70–72/3 |
| (cyclopropyl) | $CH_3-$ | $Xb$ | 78–84 | |
| (cyclopropyl) | $CH_3-$ | $Xc$ | | 93–96/0.03 |
| (cyclohexyl) | $CH_3-$ | $Xa^*$ (ethyl ester of alpha-hydroxy acid) | | 84–100/1.1 |
| (cyclohexyl) | $CH_3-$ | $Xc$ | 75–76 | |
| ph | $C_2H_5-$ | $Xa$ | | 80/0.08 |
| ph | $C_2H_5-$ | $Xb$ | 121–128 | |
| ph | $C_2H_5-$ | $Xc$ | | 134/0.03 |
| p-Cl-ph— | $CH_3-$ | $Xa$ | 92–94 | |
| p-Cl-ph— | $CH_3-$ | $Xb$ | 116–117 | |
| p-Cl-ph— | $CH_3-$ | $Xc$ | 110–111 | |
| $ph(CH_2)_2-$ | $CH_3-$ | $Xa$ | | 106/0.22 |
| $ph(CH_2)_2-$ | $CH_3-$ | $Xb$ | 106 | |
| $ph(CH_2)_2-$ | $CH_3-$ | $Xc$ | 96–7 | |

(a) *This ester is described in an example.
(b) ph equals phenyl ($C_6H_5$).
(c) $-(CH_2)_4-CHCH_3-$ derivatives are all one form starting with cyanhydrin.
(d) $-(CH_2)_2-CHCH_3-CH_2-$ derivatives are a mixture of two forms.

The foregoing table presents a detailed tabulation of the properties of less readily available starting materials and the reactant 3-unsubstituted oxazolidinediones derived from them.

The compounds of this invention are useful therapeutic agents and have been found to have anticonvulsant, analgesic, hypnotic, ganglionic blocking, prolongation of This application is a continuation-in-part of our co-pending application Serial No. 626,284, filed December 5, 1956, now abandoned.

The invention accordingly comprises the several steps and the relation of one or more of such steps with respect to each of the others and the composition possessing the features, properties and the relation of constituents which are exemplified in the following detailed disclosure and the scope of the invention will be indicated in the claims.

It is also to be understood that the following claims are intended to cover all of the generic and specific features of the invention herein described, and all statements of the scope of the invention, which as a matter of language might be said to fall therebetween.

Having described our invention, what we claim as new and desire to secure by Letters Patent is:

1. As a composition of matter a member of the group consisting of oxazolidine 2,4-dione having the formula

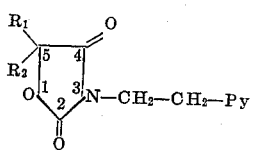

wherein Py is a member of the group consisting or 2-pyridyl, alkyl-substituted-2-pyridyl, said alkyl having a carbon content $C_1$–$C_2$, and 4-pyridyl, and $R_1$ and $R_2$ are members of the group consisting of hydrogen, lower alkyl, cycloalkyl, said cycloalkyl having a carbon content $C_3$–$C_6$, aralkyl, said aralkyl being hydrocarbon and having a carbon content $C_7$–$C_8$, phenyl, and structures wherein $R_1$ plus $R_2$ is an alkylene chain and a methyl substituted alkylene chain joined at the 5-carbon atom of the oxazolidinedione ring system said alkylene chain having a carbon content $C_4$–$C_7$, and acid addition and quaternary ammonium salts thereof.

2. A composition of matter, comprising the compound of claim 1, and a non-toxic pharmaceutical carrier therefor, for oral administration.

3. A composition of matter as defined in claim 1 the free base wherein $R_1$ is methyl; $R_2$ is hydrogen; and Py is 4-pyridyl.

4. A composition of matter as defined in claim 1 the free base wherein $R_1$ plus $R_2$ is 3-methylpentamethylene, and Py is 2-pyridyl, and having the formula

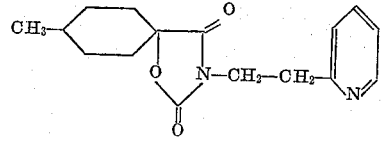

5. A composition of matter as defined in claim 1 the free base wherein $R_1$ is ethyl; $R_2$ is methyl and Py is 4-pyridyl.

6. A composition of matter as defined in claim 1 the free base wherein $R_1$ is methyl; $R_2$ is methyl and Py is 4-pyridyl.

7. A composition of matter as defined in claim 1 the free base wherein $R_1$ is p-chlorophenyl; $R_2$ is methyl and Py is 2-pyridyl.

8. A process for the preparation of a 3-pyridylethylated 1,3-oxazolidine 2,4-dione which comprises reacting a member of the group consisting of 2-vinylpyridine, 2-vinyl-5-ethylpyridine and 4-vinylpyridine and a 1,3-oxazolidine-2,4-dione having the formula

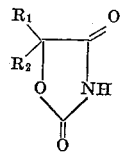

wherein $R_1$ and $R_2$ are members of the group consisting of hydrogen, lower alkyl, cycloalkyl, said cycloalkyl having a carbon content $C_3$–$C_6$, aralkyl, said aralkyl being hydrocarbon and having a carbon content $C_7$–$C_8$, phenyl, and structures wherein $R_1$ plus $R_2$ is an alkylene chain and a methyl substituted alkylene chain joined at the 5-carbon atom of the oxazolidinedione ring system said alkylene chain having a carbon content $C_4$–$C_7$ and recovering the resultant 3-pyridylethylated oxazolidinedione.

No references cited.